No. 763,658. Patented June 28, 1904.

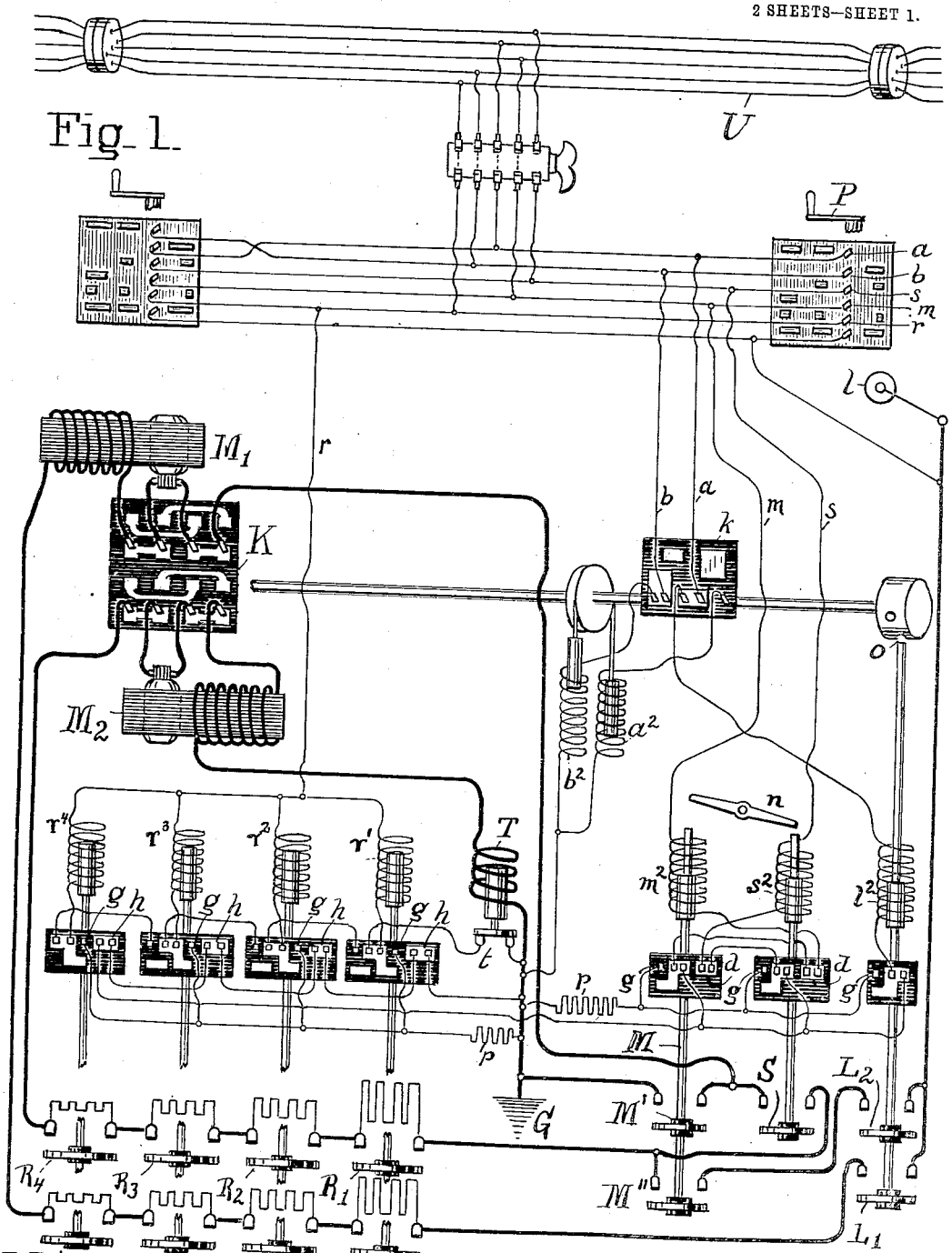

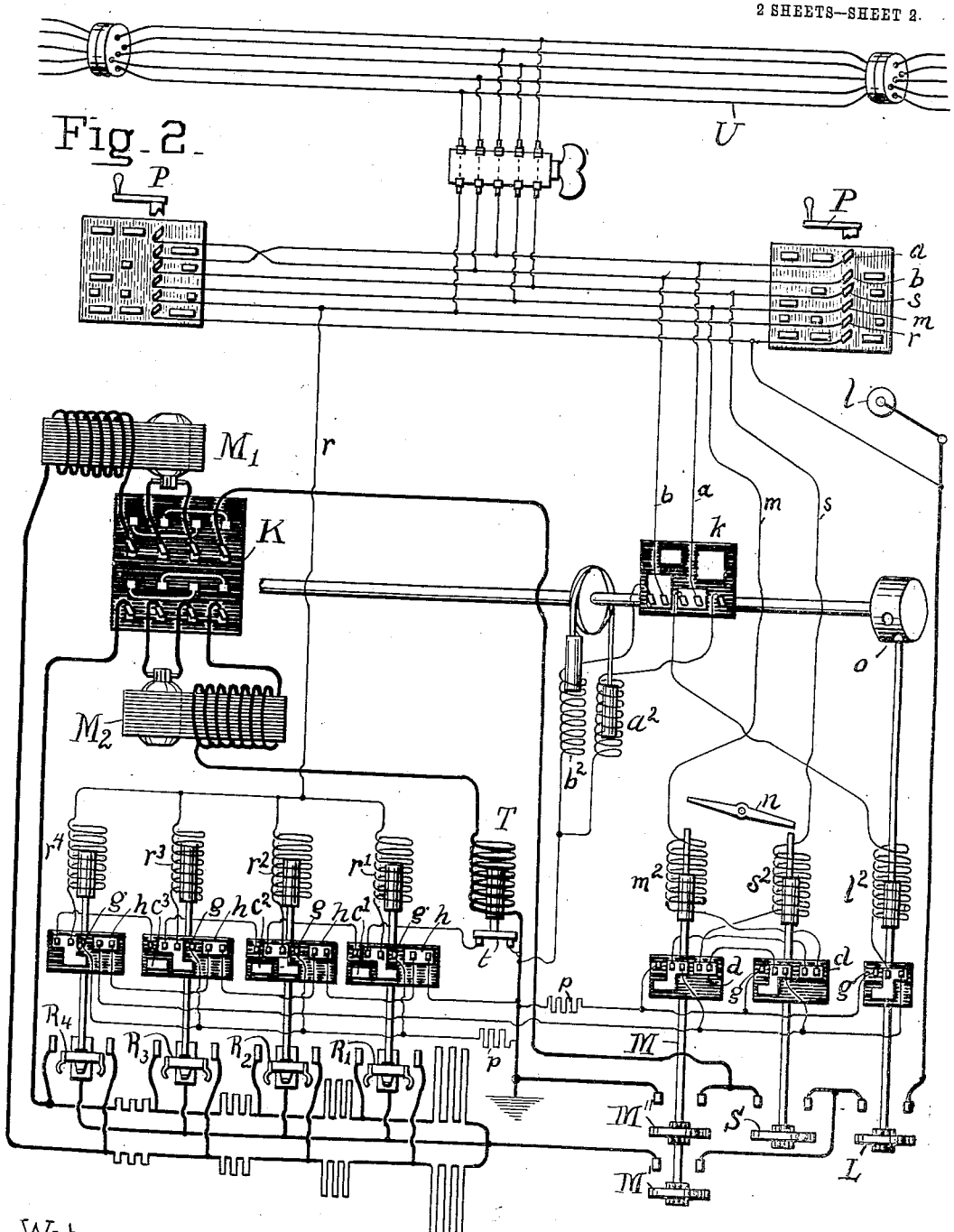

UNITED STATES PATENT OFFICE.

EUGENE R. CARICHOFF, OF EAST ORANGE, NEW JERSEY, ASSIGNOR TO SPRAGUE ELECTRIC COMPANY, A CORPORATION OF NEW JERSEY.

CONTROL OF DYNAMO-ELECTRIC MACHINERY.

SPECIFICATION forming part of Letters Patent No. 763,658, dated June 28, 1904.

Application filed August 1, 1901. Serial No. 70,516. (No model.)

*To all whom it may concern:*

Be it known that I, EUGENE R. CARICHOFF, a citizen of the United States of America, and a resident of East Orange, in the county of Essex and State of New Jersey, have invented certain new and useful Improvements in Control of Dynamo-Electric Machinery, of which the following is a specification.

These improvements have been made with the specific object in view of providing a simple and satisfactory system for the electrical control of electrically-propelled railway-trains, and they are herein shown in connection with a system similar to that disclosed in United States Letters Patent to Frank J. Sprague, No. 660,065, dated October 16, 1900, to which reference is made for details of operation here assumed or briefly stated.

These improvements relate particularly to the construction and combination of electrically-operated switches for the control of motors; but it is not essential to all the features of my invention either that the switches should be electrically operated or that they should be restricted to the control of electric motors.

One of the novel features relates to the operation of a controller for electric motors from a master controlling device which depends on the consecutive operation of a series of power-operated switches or contact devices. These switches effect changes in the motor-circuit, whereby the speed of the motors is regulated. What the changes are is not essential to the novel operation of the switches; but they are rheostatic changes in the system herein illustrated. Furthermore, in the electrically-controlled system herein illustrated the construction is such, however, that the consecutive operation of the power-operated motor-controlling switches referred to is effected by the current over a single wire from the master-switch, while the intervals of operation are automatically controlled by a throttle which operates to arrest the successive operation of the controller-switches, so as to prevent an excessive current-flow in the motor-circuit without interfering with the free operation of the individual switches.

Another novel feature relates to the connection between the control for the reverser and the line-switch. In the present case, in which I have illustrated a control system for two motors, the reverser comprises two direction-controlling switches which operate to change the relative direction of current-flow in the armature and field windings of the motor. The line-switch comprises one or more switches which make and break the circuit connections with the source of supply. In some of the claims hereto appended I have referred to the switches that perform this function as "circuit-controlling" switches. The reverser is thrown to its forward or back position by one or the other of two magnets, which are actuated from the master-switch through separate direction-controlling circuits. These circuits are led through auxiliary contacts operated with the reverser, the said contacts constituting a switch serving when the reverser is thrown into the required position to complete the direction-controlling circuit then active through the actuating-coil of the line-switch. The auxiliary contacts above referred to are so arranged that if upon the energizing of one of the direction-controlling circuits the reverser is already in the required position the circuit then active will include the actuating-coil of the line-switch, so that the line-switch will be immediately operated and the main motor-circuit closed. If the reverser is not in the required position, the circuit will then be completed through the proper magnet for throwing the reverser, and when the reverser is fully thrown this circuit will be caused to include the actuating-coil of the line-switch and the line-switch will be closed. This construction prevents the main motor-circuit from being closed until after the reverser has been correctly set. The same circuit from the master-switch is utilized for operating both the reverser and the line-switch, and in the particular arrangement which I have shown in the drawings the connections are such that this circuit is not required to energize the actuating-magnets of the reverser and the line-switch at the same time. As already stated above, the line-switch operates to control the connections between the motor-circuits and the source of supply. The direction-controlling and circuit-controlling switches, which together make up the reverser and the line-switch, constitute two independent sets of switches, and the circuit connections are such that the switches of one set cannot be operated until after the switches of the other set have been moved into the desired position. The reverser and the line-switch are thus electrically interlocked.

A further feature of novelty consists in supplementing the electrical interlock with a mechanical interlock.

In the accompanying two sheets of drawings, which form a part of this specification, Figure 1 is a diagrammatic representation of an electrical control system embodying the preferred form of my invention as applied to a single car of a train. Fig. 2 is a similar diagrammatic representation in which the main motor-circuits and rheostat connections are so arranged that the current through both field and armature of one motor is reversed when the motors are placed in multiple.

Each of the cars of the train which is equipped with motors is provided with the switches and circuits shown in the diagram, and the controlling-circuits of all the cars so equipped are connected by a train-line U of controlling-wires. Operation of a manually-operated master or governing switch P on any car closes control-circuits which govern the operation of the motor-controlling switches of the car on which the master-switch is operated and also through the train-line govern the operation of the corresponding switches on the other equipped cars of the train.

Each equipped car carries a line-switch L with two sets of contacts $L_1$ $L_2$, two driving-motors $M_1$ $M_2$, a reverser K, a series of rheostat-switches $R_1$ $R_2$ $R_3$ $R_4$, a motor-grouping switch S for placing the motors in series relation, and a motor-grouping switch M with two sets of contacts M' M'' for placing the motors in multiple relation. In the drawings I have shown these switches as operated by means of solenoids or magnets included in the control-circuits which exert a magnet pull on a part mechanically connected with the switch to be operated; but my invention is not limited to this means of actuating the switches, as it is sufficiently broad to cover power-actuated switches in general, and the claims hereto appended should be so construed.

Master controlling devices are provided at all points from which it is desired to control the operation of the train, and the master controlling device, together with the connections necessary for securing the operation of the switches in the motor-circuits, constitute an independent control system for the switch-operating means comprising actuating means and maintaining means.

In the particular embodiment of my invention which I have illustrated in my present application the control system is electrical in its character and the actuating and maintaining means are respectively actuating and maintaining circuits through which current is supplied to electromagnets which operate the switches or contact devices. In this particular embodiment the control system is connected to the source of supply in shunt to the main motor-circuit and is therefore independent of the circuit to be controlled.

Operation of the right-hand master-switch P to the right first closes a circuit through the "ahead" direction-controlling wire $a$. If the reverser is already set for movement ahead, as shown, the controlling-wire will be connected through contacts on the block $k$, carried by the reverser, directly to the solenoid-magnet $l^2$ of the line-switch and the line-switch will be closed. If the reverser is set for movement backward at the time when the circuit is closed, the circuit from the ahead direction-controlling wire will then be through a contact on the block $k$ to the reverser-operating magnet $a^2$. This will throw the reverser to the position shown, and the contacts on the block $k$ will be shifted and the direction-controlling wire will be disconnected from the reverser-magnet when it has operated and connected to the line-switch magnet.

Operation of the right-hand master-switch to the left or the left-hand master-switch to the right closes a circuit through the "back" direction-controlling wire $b$. This wire is connected through contacts on the block $k$ to the reverser-magnet $b^2$ if the reverser is set for movement forward, and when the reverser has thrown to position for movement backward, or if the reverser is in position for movement backward, when the circuit is closed on this wire the reverser-magnet $b^2$ is disconnected and the line-switch magnet is connected. The circuit through the line-switch magnet is through contacts $h$, which are opened when any of the rheostat-switches are operated. The line-switch can be closed, therefore, only when all the rheostat-switches are in their normal open position and the main motor-circuit is fully protected by the resistances. A mechanical interlock $o$ between the reverser and the line-switch is provided in addition to the contacts on the block $k$ in the control-circuits to prevent the simultaneous operation of both reverser and line-switch. In addition the mechanical interlock prevents the closure of the line-switch unless the reverser is fully thrown in one direction or the other, thereby preventing "hot touches" at the reverser and preventing the throwing of the reverser when the line-switch is closed. The reverser is consequently never thrown while current is passing through its contacts, and blow-outs or other protection against injury from arcing is not needed on the reverser. Further movement of the master-switch in the same direction after closure of the line-switch through the energizing of the wire $a$ or $b$ closes a circuit through the series control-wire $s$, which leads through the magnet-coil $s^2$ for operating the series switch. The main motor-circuit is then completed through the motors in series from the trolley-shoe $l$, contacts $L_1$ of the line-switch, the lower set of resistances, the field and armature of the motor $M_1$ and reverser-contacts, the contacts S of the series switch, the upper set of resistances, the field and armature of the motor $M_2$ and reverser-contacts, and the throttle T to ground. Further movement of the master-switch in the same direction after the closure of the series switch closes a circuit through the rheostat-control wire $r$. This wire leads to the operating-magnets $r'$ $r^2$ $r^3$ $r^4$ of a series of separately-actuated rheostat-switches $R_1$ $R_2$ $R_3$ $R_4$, which are arranged to be consecutively or progressively operated. As shown, the circuit is connected to these magnets in parallel; but this is not essential. The circuit through each coil except the one first operating is in series with contacts which are closed by the magnet which precedes in operation. These contacts form parts of interlock-switches, which are operated in conjunction with certain of the motor-controlling switches and form means for effecting automatic and progressive variation of the resistance of the motor-circuit without movement of the master or governing switch. The circuit through the magnet $r^2$ is through contacts $c'$, which are closed when the switch $R_1$ is closed. Likewise the circuit through the magnets $r^3$ and $r^4$ are through the contacts $c^2$ and $c^3$, respectively, of the rheostat-switches $R_2$ $R_3$, which precede in operation. These circuits are also through the contacts of all the rheostat-switches which precede in operation in the arrangement shown; but this is not essential to the consecutive operation of the switches. The circuits are also led through contacts which are opened on the operation of the throttle, when the current in the main circuit exceeds the limit for which the throttle is adjusted. The throttle-magnet T is in the motor-circuit, and the switch operated thereby is in the actuating-circuit of the controlling-magnets $r'$ $r^2$ $r^3$ $r^4$. The throttle therefore serves as a current-limiting device, and when the current in the motor-circuit exceeds the desired amount it automatically opens the actuating-circuit and stops the successive action of the controlling-magnets until the current in the motor-circuit is reduced by the counter electromotive force of the motors. Means described below are provided by which the operation of the throttle does not affect the magnets which have already been actuated. To insure proper action of the throttle it is constructed so as to act quickly upon the cutting out of each section of resistance, and the rheostat-switches are made to act more slowly, so that each succeeding switch will not be drawn up until the current has again fallen.

If the master-switch is set for full series ahead, then movement to the multiple position first opens all the controlling-circuits thus far discussed, thereby releasing the line, series, and rheostat switches and then after again lifting the line-switch, closes a control-circuit $m$ which leads through the operating magnet-coil $m^2$ of the multiple switch M. The main motor-circuit is then again closed, this time with the motors in parallel. The motor-circuit is then from the trolley-shoe to the line-switch, where it branches. One branch is through the lower contacts $L_1$ of the line-switch, the lower set of resistances, the field and armature of the motor $M_1$ and reverser-contacts, and the upper set of contacts $M'$ of the multiple switch to ground. The other branch is through the upper contacts $L_2$ of the lower switch, the lower contacts $M''$ of the multiple switch, the upper set of resistances, the armature and field of the motor $M_2$ and reverser-contacts, and the throttle T to ground.

The circuits through the operating-coils $s^2$ and $m^2$ of the series and the multiple switches are cross-connected to contacts $d$, which are opened by these switches, so that when either switch is lifted no current can be sent through the operating-coil of the other switch to lift it also. They are thus electrically interlocked. They are also mechanically interlocked by a bar $n$, which prevents the lifting and closure of either switch when the other is closed. Further movement in the same direction of the master-switch after the motors have been connected in multiple again closes the circuit through the rheostat-controlling wire $r$, and the rheostat-switches are again consecutively closed, as already described.

The line, series, multiple, and rheostat switches are each provided with contacts $g$, through which its own coil is connected to ground through a branch circuit, which serves as a maintaining-circuit and includes a resistance $p$. The shifting of the coils to this maintaining-circuit is effected automatically after the coil has operated, and as each of the resistance-controlling coils $r'$ $r^2$ $r^3$ $r^4$ is shifted to the maintaining-circuit it is maintained thereby unaffected by the opening of the actuating-circuit at the switch controlled by the throttle-magnet and independently of any other contacts in the system except at the master-switch. This resistance is adjusted so as to cut down the current to what is necessary to hold the switches in operated position, and it prevents undue waste of current and heating of the coils.

In the form shown in Fig. 2 the controlling-circuits are precisely as in Fig. 1, but the main motor-circuits are differently arranged. The circuit through the main motors when the series switch is operated is from the trolley-shoe $l$ through the contacts of the line-switch L, the field and armature of the motor $M_1$ and reverser-contacts, the lower set of resistances, the upper set of resistances, the field and armature of the motor $M_2$ and reverser-contacts, and the throttle T to ground. The circuit through the main motors when the multiple switch is operated is from the trolley-shoe $l$ through the contacts of the line-switch L, the lower contacts M' of the multiple switch, where it branches. One branch is through the lower set of resistances, the field and armature of the motor $M_1$ and reverser-contacts, the upper contacts M" of the multiple-switch to ground. The other branch is through the upper set of resistances, the field and armature of the motor $M_2$ and reverser-contacts, and the throttle T to ground. In this system the circuit through the motor $M_1$ is in the opposite direction when in multiple to what it is when in series; but the direction of rotation of the motor is the same in either case, since the reversal of the direction of the current is made in both field and armature.

What I claim as new, and desire to secure by Letters Patent of the United States, is—

1. The combination of an electrically-operated controller, a series of consecutively-acting magnets therefor, circuits for said magnets, and a switch for the circuit of each magnet, except the magnet first operated, which is closed by the magnet which precedes in operation, a master-switch and its circuit, the circuits of said magnets being supplied from the master-switch; substantially as described.

2. The combination with a motor, of an electrically-operated controller therefor, a master-switch and its circuit, a series of successively-operating magnets for the controller, and means for arresting the successive operation of said magnets, said magnets being slow acting to permit certain action of said arresting device; substantially as described.

3. The combination with a motor, of an electrically-operated controller therefor, a master-switch and its circuit, a series of successively-operating switches for the controller, and means for arresting the successive operation of said switches without interfering with the free operation of the individual switches.

4. The combination with an electrically-operated rheostat, of a master-switch, a circuit from the master-switch, a series of consecutively-operating rheostat-magnets, a branch circuit from the master-switch circuit through each rheostat-magnet, and contacts in the branch circuit through each magnet, except in the circuit through the magnet first operating, which is closed by the magnet which precedes in operation, substantially as described.

5. The combination with a motor, of an electrically-operated controller for the motor, a master-switch, a circuit from the master-switch, a series of consecutively-operating magnets for the controller, a throttle operated by the current through the motor, contacts in the master-switch circuit which are controlled by the throttle, and a contact in the circuit through each magnet, except the circuit through the magnet first operating, which is closed by the magnet which precedes in operation, substantially as described.

6. The combination with a motor, of an electrically-operated rheostat for the motor, a master-switch, a circuit from the master-switch, a series of consecutively-operating rheostat-magnets, a throttle operated by the current through the motor, contacts in the master-switch circuit which are controlled by the throttle, and a contact in the circuit through each magnet, except the circuit through the magnet first operating, which is closed by the magnet which precedes in operation, substantially as described.

7. The combination with a motor, of an electrically-operated rheostat for the motor, a master-switch, a series of consecutively-operating rheostat-magnets, a throttle operated by the current through the motor, contacts in the master-switch circuit which are controlled by the throttle, a branch circuit from the master-switch circuit through each rheostat-magnet, and a contact in the branch circuit through each magnet, except the circuit through the magnet first operating, which is closed by the magnet which precedes in operation, substantially as described.

8. The combination of a reverser, a line-switch, magnets for operating the reverser and line-switch, a master-switch, circuits through these magnets from the master-switch, and a switch operated with the reverser for closing the circuit through the line-switch magnet, substantially as described.

9. The combination of a reverser, a line-switch, magnets for operating the reverser and line-switch, a master-switch, circuits through these magnets from the master-switch, a switch operated with the reverser for closing the circuit through the line-switch magnet, and a mechanical interlock for preventing the operation of the reverser when the line-switch is operated, substantially as described.

10. The combination of a reverser, a line-switch, a magnet for operating the reverser in each direction, a magnet for operating the line-switch, a master-switch, circuits through these magnets from the master-switch, and a switch operated with the reverser for opening the circuit through the operated magnet of the reverser and closing the circuit through the magnet which operates the line-switch, substantially as described.

11. The combination of a reverser, a line-switch, a magnet for operating the reverser in each direction, a magnet for operating the line-switch, a master-switch, circuits through these magnets from the master-switch, and a switch operated with the reverser for opening the circuit through the operated magnet of the reverser and closing-contacts in circuit with the non-operated magnet of the reverser and with the magnet which operates the line-switch, substantially as described.

12. The combination of two electrically-operated rheostats, a series of successively-operating rheostat-magnets, each having contacts for both rheostats, series and parallel circuits for the rheostats, and means for establishing these circuits; substantially as described.

13. The combination of two electrically-operated rheostats, a series of successively-operating rheostat-magnets, each having contacts for both rheostats, series and parallel circuits for both the rheostats and the motors, and means for establishing these circuits; substantially as described.

14. In a control system for electric motors, the combination of a series of magnets controlling switches in the motor-circuit, a master-switch and an actuating-circuit for connecting and disconnecting these magnets and a source of supply of current, a maintaining-circuit, and means adapted to include the magnets successively in the actuating-circuit and to shift each magnet when it has operated to the maintaining-circuit; substantially as described.

15. In a system of electrical control, the combination of a master-switch, a series of resistance-controlling magnets, an actuating-circuit, and a maintaining-circuit for the magnets, and means whereby the magnets are successively included in the actuating-circuit and shifted to the maintaining-circuit; substantially as described.

16. In a system of electrical control, the combination of a hand-switch, a number of resistance-controlling magnets, an actuating-circuit and a maintaining-circuit for the magnets, and switches operated with the magnets and arranged to include them successively in the actuating-circuit and to shift them to the maintaining-circuit when they have been so actuated; substantially as described.

17. In a control system for electric motors, the combination of a series of a magnets controlling switches in the motor-circuit, a master-switch and an actuating-circuit for connecting and disconnecting the magnets and a source of supply of current, a maintaining-circuit, and means adapted to include the magnets successively in the actuating-circuit and to shift each magnet when it has operated to the maintaining-circuit; and a magnet in the motor-circuit adapted to check the flow of current through the other magnets when the main current exceeds a desired amount; substantially as described.

18. In a system of electrical control, the combination with a controlled motor and its circuit, of a master-switch, actuating and maintaining circuits independent of the motor-circuit, controlling-magnets, and means whereby said magnets are operated first by the actuating-circuit and are then held by the maintaining-circuit; substantially as described.

19. In a system of electrical control, the combination of a series of magnets controlling switches, a master-switch, actuating and maintaining circuits for the magnets connected therewith, means whereby the magnets are successively included in the actuating-circuit, and means for maintaining said switches; substantially as described.

20. A motor-controller having a series of switches, means for effecting automatically successive action of said switches, and an electromagnetic current-limiting device in circuit with the motors and controlling such automatic action; substantially as described.

21. A motor-controller having a series of switches, an actuating system therefor independent of the controlled circuit, means whereby the operation of each of certain switches is controlled by a preceding switch, and means controlled by the speed of the motor for preventing a too rapid operation of said switches; substantially as described.

22. The combination with a motor-controller having successively-actuated magnets, of an actuating-circuit for each of certain magnets controlled by motion of the next preceding magnet, a switch in the actuating-circuit controlled by the speed of the motor, and a shunt around said switch controlled by motion of the magnets; substantially as described.

23. The combination with a motor-controller having a series of successively-acting switches, of an actuating-circuit for each of certain switches controlled by the previously-acting switches, and a maintaining-shunt controlled by the switch itself; substantially as described.

24. The combination with a motor-controller having a series of switches, of an actuating-circuit for each of certain switches controlled by contacts in series on the switch itself and on the adjacent switches, and a shunt controlled by the switch itself and not by the adjacent switches; substantially as described.

25. The combination with a series of electromagnetically-actuated switches, of means for closing an actuating-circuit through the actuating-coil of one of said switches, means whereby each switch in operating completes the actuating-circuit through the actuating-coil of the next succeeding switch in the series, and a switch included in the actuating-circuit and controlled in its operation by the current in the motor-circuit; substantially as described.

26. In combination, a plurality of separately-actuated switches operatively related to a circuit to be controlled, actuating-coils for said switches, a control system therefor independent of the controlled circuit, the said system including a master-switch and circuit connections so arranged that the master-switch may be operated to complete a circuit from a suitable source of supply through the actuating-coil of one of the switches, and means whereby the operation of the said switch connects the actuating-coil of a succeeding switch to said control system; substantially as described.

27. In combination, a series of separately-actuated switches operatively related to a circuit to be controlled, actuating-coils for said switches, a control system therefor independent of the controlled circuit, the said system including a master-switch and circuit connections so arranged that the master-switch may be operated to complete a circuit from a suitable source of supply through the actuating-coil of one of the switches, and means whereby the operation of each switch save the last in the series, connects the actuating-coil of a succeeding switch to said control system; substantially as described.

28. In combination, a plurality of switches operatively related to a circuit to be controlled, means for operating said switches successively, and means for automatically checking the successive operation of said switches without interfering with the switches already operated; substantially as described.

29. A motor-controller comprising a series of switches, an actuating system therefor, an electromagnetic current-limiting device controlling the operation of said switches, and means whereby each switch when it is closed is rendered independent of said current-limiting device; substantially as described.

30. The combination with a motor-controller having a series of switches, of an actuating-circuit for each of certain switches controlled by a preceding switch, and a switch in the actuating-circuit controlled by the speed of the motor; substantially as described.

31. In combination, a series of switches, a current-limiting device controlling their operation, and means for rendering the current-limiting device ineffective as to any one switch after the said switch has been operated; substantially as described.

32. A controller comprising a series of switches, an actuating system therefor, means whereby the operation of each of certain switches is controlled by a preceding switch in the series, a current-limiting device for preventing a too rapid operation of said switches in succession, and means whereby each switch in operating renders the said current-limiting device ineffective so far as that particular switch is concerned; substantially as described.

33. In combination, a plurality of switches, one of which has two operative positions, electromagnetic means for actuating said switches, a controlling-circuit for the first switch, and means whereby the moving of the first switch into either one of its operative positions connects said controlling-circuit with the electromagnetic means which operates another switch or switches; substantially as described.

34. In combination, a motor-controller comprising a circuit-controlling switch and a direction-controlling switch, a controlling-circuit for the direction-controlling switch, electromagnetic means for actuating the direction-controlling switch, and means whereby the operation of said switch connects said controlling-circuit with the actuating mechanism of the circuit-controlling switch; substantially as described.

35. In combination, a controller comprising two sets of switches, electromagnetic means for actuating said switches, a master-switch constructed and arranged to close an actuating-circuit for the electromagnetic means which operates one set of switches, and means whereby the said switches in their operation connect the said actuating-circuit with the electromagnetic means which operates the other set of switches; substantially as described.

36. In combination, a motor-controller comprising a circuit-controlling switch and direction-controlling switch, electromagnetic means for actuating said switches, a master-switch having its contacts arranged to close an actuating-circuit for the electromagnetic means which operates the direction-controlling switch, and means whereby the latter switch in its operation connects the actuating-circuit for the direction-controlling switches to the electromagnetic means which operates the circuit-controlling switch; substantially as described.

37. In combination, in a motor-control system, a reversing-switch, another switch or switches for controlling the circuit connections of the motors, means for operating the reversing-switch, and means controlled by the latter switch for connecting the operating means of the reversing-switch with the actuating mechanism of the circuit-controlling switch or switches; substantially as described.

38. In combination, in a motor-control system, a reversing-switch, another switch for controlling the circuit connections of the motors, electromagnets for moving the said reversing-switch to one or the other of its two operative positions, a master-switch having its contacts arranged to close an electric circuit through the coil of one or the other of said electromagnets, and auxiliary contacts arranged to be operated with the reversing-switch contacts, said auxiliary contacts operating before the switch has been thrown to close the circuit from the master-switch through the reversing-switch actuating-coil and after it has been thrown to close the said circuit through the actuating-coil of the circuit-controlling switch; substantially as described.

39. In combination, a reversing-switch, a circuit-controlling switch, electromagnetic actuating means for said switches, a master-switch, two conductors leading from the master-switch to the reversing-switch-actuating means, contacts in the master-switch for closing a circuit at will through either of said conductors, and connections whereby the movement of the reversing-switch into the position determined by the said conductor through which the circuit has been closed causes the said conductor to serve as a portion of an operating-circuit for a circuit-controlling switch or switches; substantially as described.

40. In a controlling system for a plurality of electric motors having resistance elements primarily in circuit therewith, the combination with a manually-operated governing-switch and a series of power-operated motor-controlling switches corresponding to full series and full multiple connections of the motors and to intervening resistance values, of means for effecting progressive operation of the resistance-varying switches without movement of the governing-switch.

41. In a controlling system for a plurality of electric motors having resistance elements primarily in circuit therewith, the combination with a manually-operated governing-switch for establishing initial series and initial multiple connections and a series of power-operated motor-controlling switches, of means for effecting progressive operation of a plurality of the motor-controlling switches without movement of the governing-switch.

42. In a controlling system for a plurality of electric motors having resistance elements primarily in circuit therewith, the combination with a manually-operated governing-switch for establishing initial series and initial multiple connections, and motor-controlling switches, of a series of interlock-switches operated in conjunction with certain of the motor-controlling switches to effect an automatic and progressive variation of the resistance of the motor circuit or circuits without movement of the governing-switch.

43. In a controlling system for electric motors, the combination with a series of power-operated, motor-controlling switches and a governing-circuit having a manually-operated governing-switch, of means independent of the governing-switch movement for effecting successive operation of the motor-controlling switches which vary the resistance of the motor-circuit and means for interrupting said successive operation when the motor-current becomes excessive.

44. In a system of control, the combination of a group of successively-operating contact devices, means for effecting their automatic progression, a master controlling device, and a controlling system comprising actuating means and maintaining means operatively related to said master controlling device.

45. In a system of control, the combination of a group of successively-operating contact devices, means for effecting their automatic progression, a master controlling device, a controlling system comprising actuating means and maintaining means operatively related to said master controlling device, and means whereby the progression of said contact devices may be arrested without interfering with the maintaining means for the contact devices already operated.

46. In a system of control, the combination of a plurality of motors, controlling-switches for said motors comprising a number of successively-operating contact devices, actuating means controlled by the contact devices and adapted to effect their automatic progression, a master controlling device controlling said actuating means, and means for arresting the progression of the contact devices without releasing the contacts already operated.

47. A motor-controller comprising a series of separately-actuated contact devices, an actuating system therefor, means whereby the operation of each of certain contact devices is controlled by a preceding contact device in the series, maintaining means for said contact devices, and means for rendering said actuating system inoperative without effecting the operation of said maintaining means.

48. In a control system, the combination of a series of power-operated switches, a master controlling device, means for connecting and disconnecting the switch-operating means and a source of supply of power, maintaining means, and means for connecting the switch-operating means to the maintaining means when the switch has operated.

49. In a system of control, the combination of a master controlling device, a series of resistance-controlling switches, a control system comprising actuating and maintaining means for said switches, and means whereby the switches are successively connected to the actuating means and are shifted to the maintaining means.

50. In a system of control, the combination with a controlled motor and its circuit, of a master controlling device, successively-operating controlling-switches, and actuating and maintaining means independent of the motor-circuit and controlled by the master controlling device.

51. In a control system, a series of successively-operating switches, an actuating system therefor, a master controlling device, and means for preventing a too rapid successive operation of the switches without interfering with the free operation of the individual switches.

52. The combination with a motor, of an electrically-operated controller for the motor, a master-switch, a series of consecutively-operating magnets for the controller, means operated by the current through the motor for arresting the consecutive operation of said magnets, contacts in the master-switch circuit which are controlled by said means, and a contact in the circuit through each magnet except the circuit through the magnet first operated which is closed by the magnet which precedes it in operation.

53. The combination of a reverser, a line-switch, power-actuated means for operating the reverser and line-switch, a master controlling device, connections to said power-actuated means from the master controlling device, and means operated with the reverser for controlling the connection to the line-switch-actuating means.

54. The combination of a reverser, a line-switch, power-actuated means for operating the reverser and the line-switch, a master controlling device, connections to said actuating means from the master controlling device, means operated with the reverser for controlling the connection to the line-switch-actuating means, and an interlock for preventing the operation of the reverser when the line-switch is operated.

55. The combination of a reverser, a line-switch, power-actuated means for operating the reverser in each direction, power-actuated means for operating the line-switch, a master controlling device, connections to these power-actuated means from the master controlling device, and means operated with the reverser for opening the connection to the power-actuated means of the reverser and for closing the connection to the actuating means for the line-switch.

56. The combination of two rheostats each having a plurality of resistance-sections, and a plurality of power-actuated contact devices for controlling the several resistance-sections of said rheostats, each contact device having contacts for both rheostats.

57. The combination of two rheostats, a plurality of power-actuated contact devices for controlling said rheostats, each contact device having contacts for both rheostats, and means for producing automatic progression of said contact devices.

58. The combination of two rheostats, a series of successively-operating contact devices, each having contacts for both rheostats, series and parallel connections for the rheostats, and means for establishing these connections.

59. The combination of two power-operated rheostats, a plurality of motors, a series of successively-operating contact devices, each having contacts for both rheostats, and means for establishing series and parallel connections for both of the rheostats and the motors.

60. In combination, a series of separately-actuated switches, actuating means for said switches, a control system therefor, said system including a master controlling device and connections so arranged that the master controlling device may be operated to connect the actuating means of one of said switches to a suitable source of power, and means whereby the operation of each switch save the last in the series connects the actuating means of a succeeding switch to said control system.

Signed by me in New York city, New York, this 31st day of July, 1901.

EUGENE R. CARICHOFF.

Witnesses:
SAMUEL W. BALCH,
GEO. L. WHEELOCK.